(No Model.) 7 Sheets—Sheet 1.

R. EICKEMEYER, Dec'd.
R. EICKEMEYER, Jr., Executor.
METHOD OF AND MEANS FOR BLOCKING AND BANDING FELT HATS.
No. 540,219. Patented May 28, 1895.

Attests:
Howell Bartle
Emma Marks

Inventor:
Rudolf Eickemeyer,
By ____
Attorney.

(No Model.) 7 Sheets—Sheet 2.

R. EICKEMEYER, Dec'd.
R. EICKEMEYER, Jr., Executor.
METHOD OF AND MEANS FOR BLOCKING AND BANDING FELT HATS.

No. 540,219. Patented May 28, 1895.

Attest:
Howell Battle
Emma Morss

Inventor:
Rudolf Eickemeyer,
By M. C. Morss
Attorney (No Model.) 7 Sheets—Sheet 3.

R. EICKEMEYER, Dec'd.
R. EICKEMEYER, Jr., Executor.
METHOD OF AND MEANS FOR BLOCKING AND BANDING FELT HATS.

No. 540,219. Patented May 28, 1895.

Attest:
Howell Castle
Emma Marks

Inventor:
Rudolf Eickemeyer
By M. C. Ward
Attorney (No Model.) 7 Sheets—Sheet 4.

R. EICKEMEYER, Dec'd.
R. EICKEMEYER, Jr., Executor.
METHOD OF AND MEANS FOR BLOCKING AND BANDING FELT HATS.

No. 540,219. Patented May 28, 1895.

Attest:
Howell Barth
Emma Marts

Inventor:
Rudolf Eickemeyer
By McC Wood
Attorney

(No Model.) 7 Sheets—Sheet 5.

R. EICKEMEYER, Dec'd.
R. EICKEMEYER, Jr., Executor.
METHOD OF AND MEANS FOR BLOCKING AND BANDING FELT HATS.

No. 540,219. Patented May 28, 1895.

Attest:
Howell Bartle
Emma Marks

Inventor:
Rudolf Eickemeyer,
By McC Mure
Attorney (No Model.) 7 Sheets—Sheet 6.

R. EICKEMEYER, Dec'd.
R. EICKEMEYER, Jr., Executor.

METHOD OF AND MEANS FOR BLOCKING AND BANDING FELT HATS.

No. 540,219. Patented May 28, 1895.

Attest:
Nowell Bartle
Emma Marks

Inventor:
Rudolf Eickemeyer
By M. C. Wood
Attorney

United States Patent Office.

RUDOLF EICKEMEYER, OF YONKERS, NEW YORK; RUDOLF EICKEMEYER, JR., EXECUTOR OF SAID RUDOLF EICKEMEYER, DECEASED.

METHOD OF AND MEANS FOR BLOCKING AND BANDING FELT HATS.

SPECIFICATION forming part of Letters Patent No. 540,219, dated May 28, 1895.

Application filed January 7, 1895. Serial No. 534,032. (No model.)

*To all whom it may concern:*

Be it known that I, RUDOLF EICKEMEYER, of Yonkers, in the county of Westchester and State of New York, have invented a certain new and useful Method of and Improvement in Means for Blocking and Banding Felt Hats; and I do hereby declare that the following specification, taken in connection with the drawings furnished and forming a part of the same, is a clear, true, and complete description of the several features of my invention.

My present invention, relates to operations upon fur felt hat bodies, all of which require a tender, delicate and careful treatment, which is quite unnecessary in blocking and banding wool felt hats.

It is a well known fact, that felted fabrics which have been forced to assume special forms, by stretching operations, invariably attempt to "crawl back," (in hatters' terms) to forms more or less approximating to those in which the fabrics were left by the original felting operation, and recognizing that fact, I have sought, and as I believe accomplished for the first time, the development of the band portion of a hat body, by felting, or what may be termed re-felting, that portion of the hat body, into the desired contracted peripheral form and dimensions.

A properly stretched hat body, has a well defined tip, a side crown, and a brim, but the band portion, which is between the so defined side crown and brim, is normally flaring, and of greater circumference than the side crown, and although various methods have been heretofore devised and employed for developing said band portion into a proper "band," all of said methods have involved a radical straining and stretching of the felt, so that during subsequent hatting operations, the tendency has been, for the band to more or less resume the original enlarged and flaring condition of the band portion of the hat body, and the same is true of such hats when finished, although in a measure such tendency is checked, by the usual encircling textile fabric bands which are applied as trimmings, and especially when such fabrics are practically non extensible.

Inasmuch as all felting operations, essentially involve contraction of the mass of feltable fiber, it follows, that said mass cannot while being felted, be subjected to outward stretching or expansive strains, but should be free to contract, within such limits as may be prescribed by "forming" appliances or supports, upon and to which, the fabric by contraction in felting is made to substantially conform, and in the blocking and banding of felt hats, I have, as I believe, for the first time, succeeded in devising a method of, and means for, developing the band portion of a stretched hat body, into a band appropriate to the side crown and brim, by a felting or re-felting operation, and without the radical stretching strains involved in all prior mechanical methods known to me.

My said novel method of blocking and banding felt hats, consists of three steps, each of which will be separately defined, with an accompanying comparison thereof, with such steps in prior or old methods, as may properly be compared with those of my novel method.

The first step in my said method, consists in distending the inverted crown of a brim-clamped and properly stretched hat body, by steam pressure, and permeating it with very hot water, incident to condensation of the steam in direct contact with the felt. As compared with prior methods, the inverted hat body, is wholly distended by steam pressure, with the incident hot water permeation, instead of mainly distending an inverted hat body, by the complete and forcible entry of a banding shell, and distending the tip portion by steam pressure, with accompanying hot water, as described in United States Letters Patent No. 72,726, issued to me December 31, 1867, and since then practiced. Under the new method, the entire crown of a hat body is therefore more thoroughly permeated with hot water and steam, than by the old method, and more completely distended and freed from wrinkles, and without mechanical strains.

The second step in my novel method, consists, while brim-clamped, and distended by steam, and permeated with very hot water, in turning the hat right side out, by the gradual free insertion of an appropriate forming support, or block, and employing steam pressure for laying the felt upon the top and sides of the block smoothly and compactly. This step differs from the operation in the prior method referred to, in that in the latter, the inverted hat body is turned right side out by the forcible and complete insertion of a block, and mechanically straining and stretching the felt, upon the block by the banding shell, instead of having the felt laid smoothly and compactly upon the block at side crown, and tip, by steam pressure, although the tip portion was exposed to steam pressure, under said prior method. Otherwise stated, under the old method, the hat body is turned inside out by the mechanical operation of a hollow shell forcibly applied, until it occupies the entire crown, whereas by the new method, a similar shell, is slightly engaged with the hat body near its band portion, and the crown is then blown inside out by steam pressure, but the mode of inverting the hat body is in itself immaterial, so long as it is done without straining the hat, and also so that the block or support, in turning it right side out, can operate without straining the felt, and enough space afforded between the block and the shell, at all times, to permit the steam to operate in compacting and laying the felt upon the top and sides of the block.

The third step in my novel method, consists in gradually felting or re-felting the band portion of the hat body, while it is still brim-clamped, and internally supported, and permeated by hot water and steam, and by said felting operation, peripherally contracting said band portion to dimensions and form, appropriate to the side crown of the hat, and in substantial conformity with, or to, the corresponding portion of the hat support, or block. This mode of operation is radically new in the art of blocking and banding felt hats, as will be made apparent upon the following review of such prior methods, as are now commonly practiced.

In the method disclosed in my aforesaid Letters Patent No. 72,726, the felt is always mechanically strained and distended by the conjoint action of a banding shell, and a banding ring, and by a forcibly entered hat block, and that method is wholly devoid of any of that so called "jiggering" or felt working action upon the hat body, which however applied, is an absolutely essential action in all felting operations, and by means of which, a mass of feltable fiber is "felted," or in other words united, condensed in mass, and contracted. This "jiggering" or felting action, must also be conducted in the presence of very hot water, or ample steam moisture, and although such heat and moisture were involved in said old method, they served only to facilitate the radical straining and stretching to which the felt was subjected, the edge of the banding shell, and the edge of the banding ring, affording surfaces over and upon which, the felt was continuously drawn and strained.

In my present method, the necessary felting action is secured by causing the banding shell to be fed with steam under pressure, and consequently supplied with very hot water by condensation, and also by rapidly reciprocating the shell with a slight range of movement, in contact with the band portion of the hat body, said movement being the "jiggering" action referred to, and the felting action is not only due to the limited rapid movement, but also to the fact, that no expensive stretching strains are involved, and also because the felt is thoroughly permeated with very hot water and steam, and hence is alive and promptly responsive to all conditions which are favorable to changes of form, by that contraction which is inevitable with felting action.

Another old method of later date, and much more extensively employed than the prior method first mentioned, involves no steam pressure, and although the hat bodies are first dipped in hot water, no such desirable and effective temperature is possible, as when steam is employed with its very hot water of condensation, as by the new method, the hat bodies being in that method, as in the old, more or less initially saturated with hot water. The hat bodies are then "overstretched" at the side crown, (as by expanding blocks,) and this excessive or over stretching, develops the upper part of the band portion, by peripheral enlargement, and the lower part is reduced diametrically, by heavy stretching strains on the felt, said strains being mechanically applied in vertical lines on the side crown, either as by a hand operated banding ring, or by a rapidly reciprocating banding ring, having a comparatively wide range of movement, co-operating with an auxiliary banding ring, a block, and radially operated brim clamping and stretching tongs. This last named method was fully indicated in my United States Letters Patent No. 167,083, dated August 24, 1875, and No. 244,041, dated July 12, 1881, and was employed in the banding of both fur and wool hats. The use of brim stretching tongs last referred to, results in such distortion at the edges of brims, as to require subsequent clipping or trimming, with a consequent waste in felt and felting material, which is now wholly obviated. A similar prior method, is restricted to wool hats, and differs from that last described, in involving but little if any over stretching of the side crown, and no outward stretching strains upon the brim, but the band portion of the hat was forced into shape, by rapid brief strains or heavy pulls upon the side crown, while the brim was positively clamped, and supported near the block by an auxiliary banding ring. This method is fully indicated in my Letters Patent No. 200,034, dated February 5, 1878. Wool hats thus banded, are in practice, subsequently tied to, and steamed upon blocks, which results in so shrinking the band to the block, as to perfect the formation of the band, beyond the results attainable by the previous mechanical operation of the block, and the banding rings, both reciprocating, and auxiliary.

Briefly stated, in all of these prior methods, the band portion of the hat body, is made or forced to assume the required shape, and also its reduced peripheral dimensions, by the stretching, pulling, and straining of the felt, which is under stretching tension throughout the banding operation, whereas by my new method, the change in shape and peripheral dimensions, is effected by felting action, with the resulting shrinking or contracting of the felt, which is practically free from stretching strains, and under no more tension, than is requisite for enabling the progressive operation of felting to be properly accomplished.

The means devised by me, with special reference to blocking and banding hats in accordance with my novel method, involve many valuable novel features, with objects as follows, viz: for favorably clamping the brim of the hat body; for readily mounting and detaching the banding shell; for concentrically gaging the hat body and securing its proper presentation to the shell; for securing the inversion and distension of the entire crown of a hat body by steam pressure; for so organizing the brim clamp, the block and the banding shell, as to enable an inverted hat body to be turned right side out without straining the hat body, and enabling the tip and side crown to be compacted and laid upon the block by the pressure of steam; for varying the co-operative relations in position, and as to time, between the brim clamp and the banding shell, and block; for automatically and variably controlling the weighted portion of the brim clamp; also for stopping the machine with the block and brim support, in such position, as will enable the block with a hat thereon, to be removed at will, and for thereafter dropping the block carrier below said support. These features involve various novelties in construction and organization, all of which after description in detail, will be duly specified in appropriate clauses of claims, which will be hereunto annexed.

For particularly describing the novel method hereinbefore indicated, and the mechanism which has been devised by me with special reference to operating under said method, reference will be had to the accompanying drawings, of which, there are seven sheets, and figures as follows.

Figures 1, 2, 3, 5, 6:
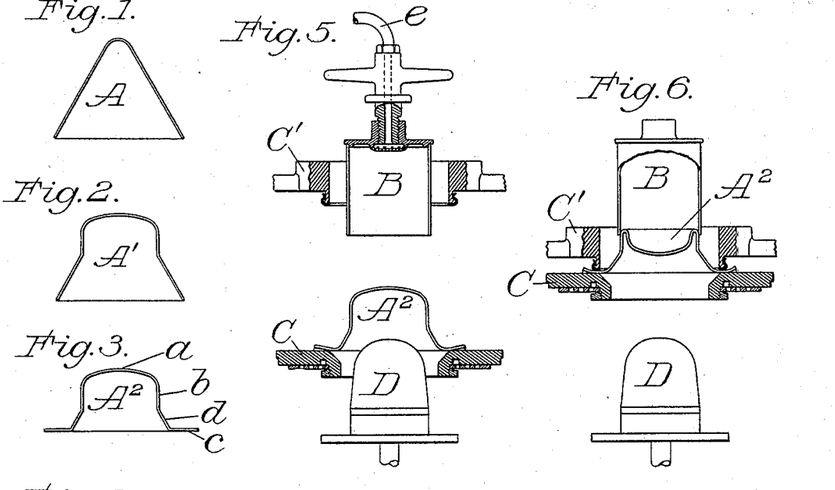
Figures 1, 2, 3, and 4 respectively illustrate a felt-hat cone, a tip-stretched hat-body, a brim-stretched hat-body, and a banded hat.
Fig. 5 illustrates a properly-stretched hat-body, a steam-fed banding-shell, a brim clamp, and a hat-block all preliminary to procedure.
Fig. 6 illustrates the same as in Fig. 5, but with the working devices in such relations that the inversion of the hat-body has been commenced by the action of the steam.
Figure 4:
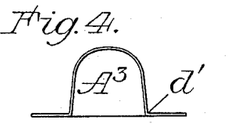

Referring to Figs. 1, to 4, inclusive, I will first call attention to Fig. 1, wherein a hat body or cone A, is fairly illustrated in its original felted form. Such a cone, having been properly subjected to the tip stretching operation, assumes a form fairly indicated by the hat body $A'$, Fig. 2, and after brim stretching, it assumes a form fairly indicated by the hat body $A^2$, Fig. 3, the body being then ready for blocking or banding, and its parts being therein indicated as follows: Tip $a$, side crown $b$, and brim $c$, with an enlarged or flaring part at $d$, which is between the side crown and brim, and constitutes the band portion of the hat body, which must be developed into a perfect band $d'$, as in the fairly shown, blocked and banded hat $A^3$, Fig. 4. The conversion of this flaring band portion $d$, into a proper band $d'$, is one of the most critical operations in the art of fur felt hatting, and it is to this particular conversion or banding operation, that my present invention wholly pertains, it being understood, that the term "blocking" at this stage of hatting, consists mainly of said "banding" operation, but also includes more or less crown shaping.

The heating and the wetting, and the mechanical elements which directly co-operate with each other, and upon a hat body, for carrying out my novel method, briefly stated, are as follows: A source of steam (not shown) for delivery of steam under pressure, by way of a pipe $e$, to a banding shell B, the condensation of the steam affording very hot water in ample quantity; a brim clamp in two parts, viz: a base C, and a clamping cap $C'$, and a block D, these parts being provided with appropriate means essential to their proper co-operation.

Figure 7:
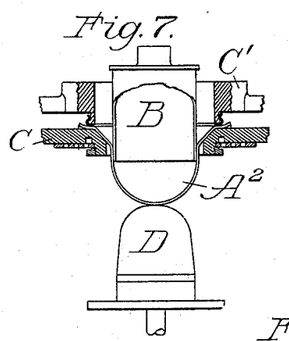
Fig. 7 illustrates the hat-body inverted by steam pressure and distended, the wrinkles being removed, and the felt permeated with steam and hot water from condensation.
Figure 8:
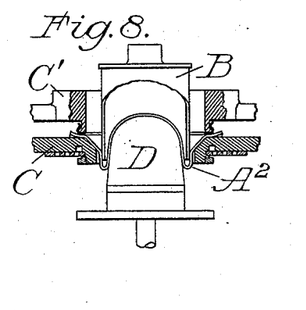
Fig. 8 illustrates the progressive turning of the hat-body right side out by a block, the tip and side crown being smoothly laid and compacted by the pressure of steam, and with the felt between the brim and the block free from strains.

Preparatory to the first step in my novel method, the hat body $A^2$, as shown in Fig. 5, is mounted on the base of the clamp, and then it is clamped at its brim, and with its crown upright, is so presented to the shell B, that the latter can closely engage with a portion thereof, as shown in Fig. 6. Steam upon being admitted to the shell under proper pressure, will then invert the hat body, and smoothly distend it, as shown in Fig. 7, the felt being permeated by the steam, and the very hot water, incident to condensation, thus concluding the first step in my method. The second step consists in turning the inverted and smoothly distended hat body right side out, by the free and sufficiently gradual insertion of the block D, as shown in Fig. 8, the pressure of the steam causing the hat body to be laid smoothly and compactly upon the top and sides of the block, the felt being in the meantime, so slackened by the slight descent of the brim clamp, as to be absolutely free from contact with the bottom or edge of the banding shell, as clearly shown in Fig. 8. Below the edge of the shell, the felt, as shown, in Fig. 8, forms an annular pocket which receives the hot water of condensation, thus specially saturating that portion of the felt which is to be specially worked upon, and by the time the block has been so far inserted, that the band portion of the hat body is encircled by the banding shell, the second step of my method is concluded.

Figure 9:
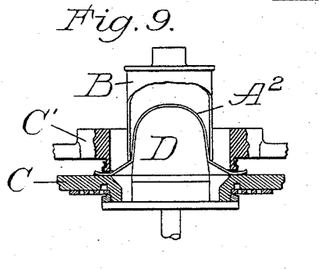
Fig. 9 illustrates the beginning of the felting action upon the band portion of the hat-body.
Figure 10:
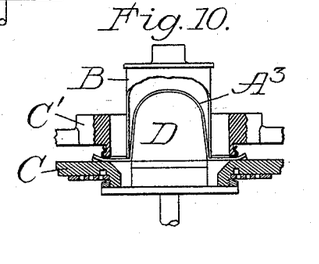
Fig. 10 illustrates the closing of the felting action and indicates the change in the position of the brim in passing from the conditions at Fig. 9 to those of Fig. 10 for relieving the brim from undue strains.

The third step in my method, as hereinbefore indicated, consists of gradually felting the band portion of the hat body, which is accomplished by vertically reciprocating the banding shell, thus affording the "jiggering" movement, which, with the steam and the hot water, secures the desired felting action, and causes the band portion to contract peripherally, and to conform to the corresponding surface of the block. This felting action would be mainly accomplished and concluded, with the brim of the hat body laid at right angles to the side crown, as shown in Fig. 10, but said action would be well under way, while the brim occupied a previously depressed position, as shown in Fig. 9, the brim being at all times, free from such strains as would prevent the desired contraction of the band portion, and also free to respond to such felting shrinkage, as would result from the abundance of heat and moisture, and the vibratory or tremulous condition to which all unconfined or unsupported portions of the hat body would be subjected, by the jiggering movement of the banding ring.

It is now to be understood, that the means thus far described, may be variously organized with operative mechanism, without departure from the main feature of my invention, it being obvious, that if the method described, should be practiced by imparting to the banding shell, the brim clamp and the block, their requisite movements by the personal manipulation of an operator, hats could be well banded, but having commercial value in view, it is imperative, that rapidity in operation should be provided for, with attendant economic advantages, all of which has been carefully considered by me, in devising the organization next to be described.

The machine which is shown in the drawings has been devised by me for accomplishing the ends stated, and although it has general resemblances to machines heretofore patented to me, it is radically unlike any of them, in many important features of construction, organization, and modes of operation.

The frame of the machine as shown in several large figures, consists of two side plates E, $E'$, united by a lateral plate $E^2$, centrally located, and another at $E^3$, near the bottom of the machine. The side plates and the lower plate are provided with appropriate seats for journal boxes, and all of said plates afford seats for guide bearings, in which vertical rods or spindles are reciprocated. Commencing with the banding shell B, it is as usual composed of metal, oval in outline, and open at the bottom, but as a novel feature it is provided with an interior chamber $B'$, below its neck so perforated laterally, as to secure a favorable distribution of the steam, and especially the hot water resulting from condensation in the valve and pipes.

Figures 16, 17:
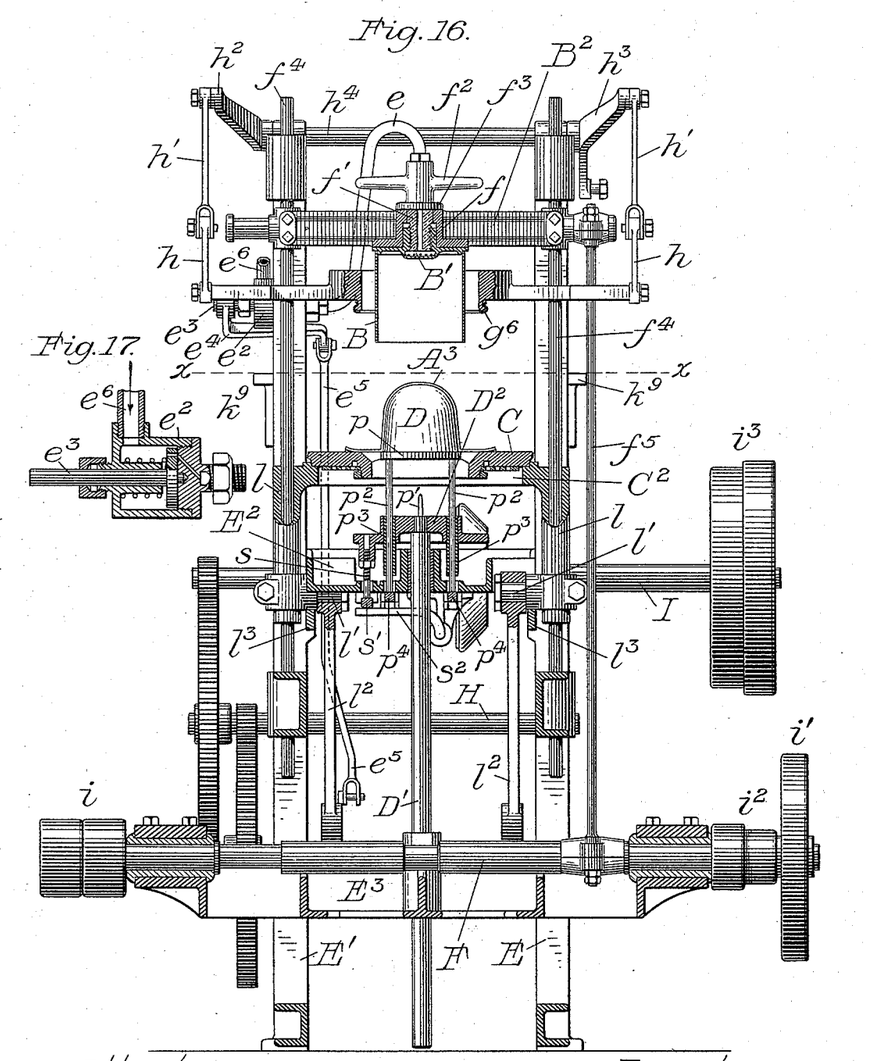
Fig. 16 illustrates the machine mainly in transverse vertical section, but with several portions removed and with the brim-clamp and banding-shell in positions as shown in Figs. 11 and 14, but with the hat-block carrying a banded hat and in the position it occupies at the close of each operation.
Fig. 17 illustrates in section the automatic steam-valve which controls the delivery of steam to the banding-shell.

It will be understood, that, several different sizes of banding shells are required, and hence I have now provided each with a neck $f$, screw threaded internally, and longitudinally slotted, for the prompt and free reception of a hollow stem $f'$, which is externally threaded, and similarly slotted, and provided with handles $f^2$, and with a flange $f^3$, thus affording a lock screw joint, by means of which, the banding shell may be readily applied to, and detached from a cross head $B^2$, which is socketed to receive the neck $f$, of the banding shell. When the screw threaded portions of the stem $f'$, are located opposite to the slotted portions of the neck $f$, the stem and neck are free to operate like a tenon and mortise, i. e., in a longitudinal line, and when thus put together, the partial rotation of the stem in the right direction, causes the screw threaded portions to engage with each other in locking and clamping union, not only with reference to each other, but of both to the cross head, and a reversed rotative movement, of course leaves the stem and shell free to separate. At the top of the hollow stem $f'$, there is a screw threaded tip $e'$, to which a suitably bendable or flexible pipe $e$, is coupled, this being connected with an automatically operated steam valve $e^2$, all as shown in Fig. 16, and in part in detail, in Fig. 17. The steam valve $e^2$, is rotative, its spindle $e^3$, having thereon a bent arm $e^4$, to which a pendent link $e^5$, is attached, as heretofore, for coupling it to an appropriate vertically movable lever, in the lower portion of the machine, as will be hereinafter further described. It is immaterial in what manner this valve may be actuated, provided it be opened when a hat body has been properly presented to the banding shell, and closed at the conclusion of the banding operation. To the induction port of this valve, at $e^6$ a supply steam pipe, (not shown,) is coupled.

Figures 14, 15:
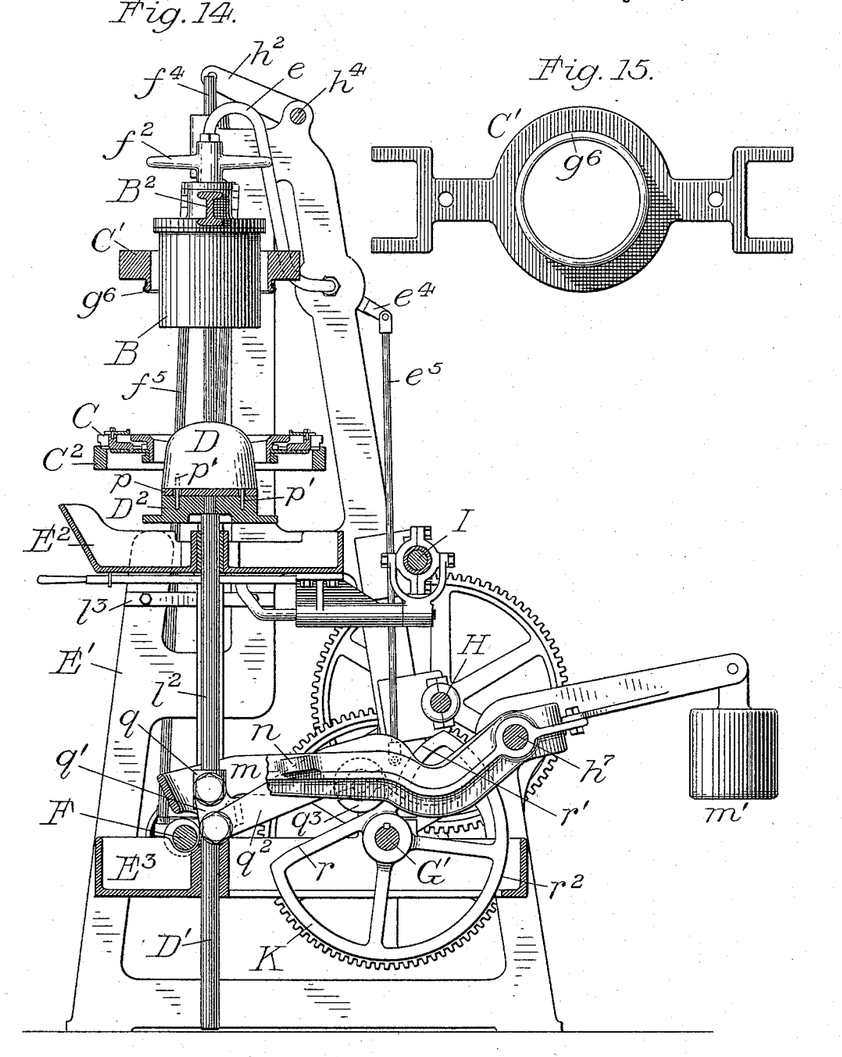
Fig. 14 illustrates the machine in vertical section with the parts in position as in Fig. 11.
Fig. 15 is a bottom view of the cap-section of the brim-clamp.
Figure 26:
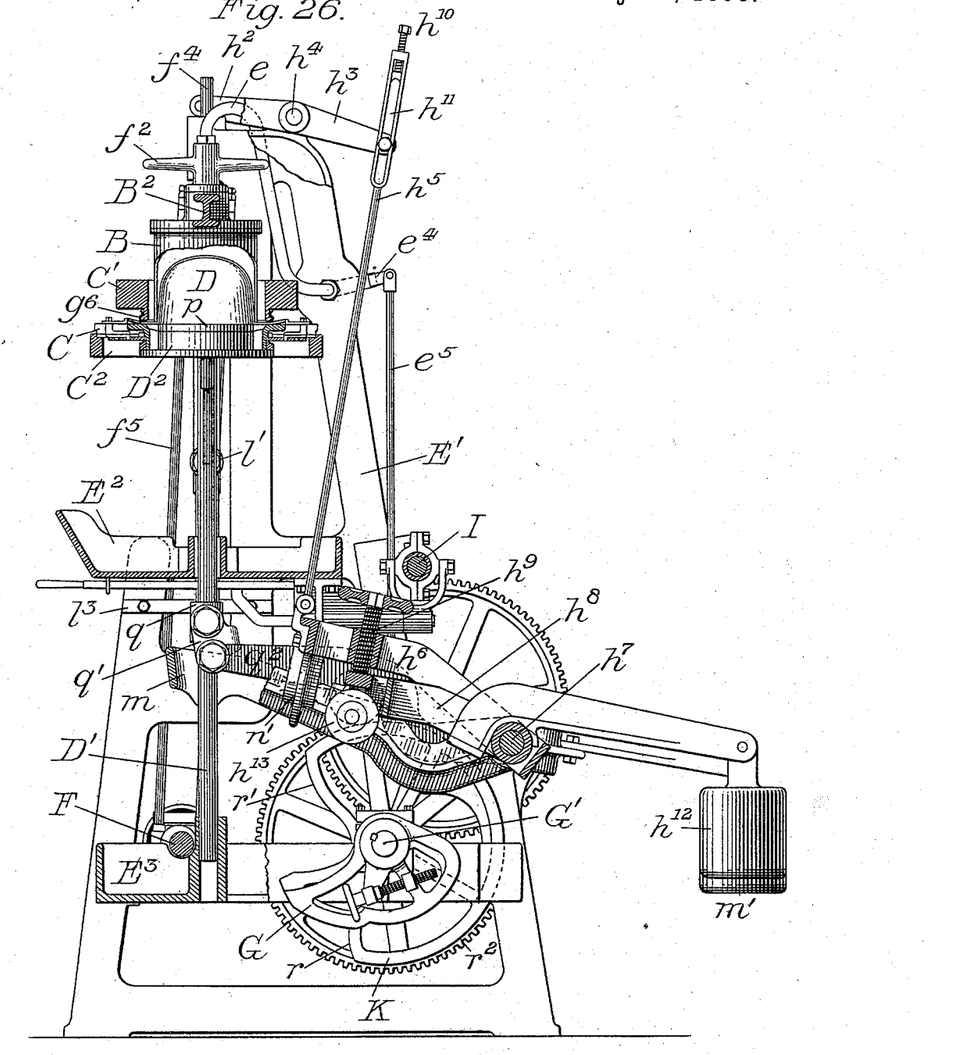
Fig. 26 is a vertical section of the machine, similar to Fig. 14, but with the banding-shell, the brim-clamp, and the hat-block in positions occupied while concluding the banding operation.

The cross head $B^2$, as shown in Figs. 14, 16 and 26, is securely mounted upon two vertical slidable rods, $f^4$, $f^4$, provided with guide bearings on the two side plates, and said cross head is coupled by means of two pitmen, $f^5$, $f^5$, with cranks on the main shaft F, of the machine, said cranks having a throw which is limited to, say three sixteenths of an inch, so that when said shaft is properly speeded, it will be driven at say five hundred revolutions per minute, and impart to said cross head and banding shell, a corresponding rapid, and vibratory, or short reciprocatory movement.

In my Letters Patent No. 53,661, dated April 3, 1866, I disclosed a blocking machine, having a stationary banding shell, and in my Letters Patent No. 72,726, dated December 31, 1867, I disclosed another machine wherein several banding shells of different sizes were axially mounted, but each shell was stationary when in service, and it was supplied with steam by means of an automatic valve.

The brim clamp, is composed of a base section or member C, and a cap section or member C′, and each contains novel features. Unlike prior brim clamp bases, in banding machines, the base C, has no auxiliary banding ring, but has its oval opening, broadly beveled inwardly, as shown at $g$, in Figs. 22 to 25 inclusive, this being important for enabling the inner portions of the brim to be free to respond to vibrations, and to assume different positions, and to enable them to be free from such strains as I have specially sought to avoid. I have also provided the base section with an adjustable brim gage, shown in detail in Figs. 22 to 25 inclusive. This brim gage is somewhat similar to gages devised by me and heretofore employed in machines for other purposes, (brim planing) but it possesses, a peculiar value as now constructed, in combination with the banding shell, in assuring the proper entrance thereto, of the crown of a hat body, and being adjustable, it is adapted for use with hats of all sizes or widths of brim. This adjustable gage, consists of a series of gage contact blocks $g'$ uniform in construction, and movable in radial slots, and provided with studs $g^2$, which occupy curved tangential slots $g^3$, in a cam plate $g^4$, which is rotative and provided with a handle $g^5$, so that by turning said cam plate, the gage blocks are simultaneously moved outwardly or inwardly upon the brim supporting surface, and set at the proper points for such contact with the brim of a hat body, as will assure its proper central location on the base of the clamp. As here shown, the blocks $g'$, are circularly arranged, but each block is so adjustable with relation to its stud $g^2$, that an oval arrangement can be provided for if desired.

The cap section C′, differs from the corresponding portion of prior brim clamps in blocking machines, in that, instead of having a broad annular or oval clamping face, for contact with the entire surface of a brim, it has a pendent flange affording a narrow annular or oval face $g^6$, (covered with felt or with rubber,) which bites upon a correspondingly limited portion of the brim, closely adjacent to the flaring band portion $d$, of a hat body, thus avoiding any undue clamping control of the adjacent interior portions of the felt, as shown in Figs. 7 and 15, and elsewhere. The two sections of the clamp, at times move independently of each other, and at other times, they move together, this occurring when the base section carries on it, the cap section.

I will first describe the mechanism by which the cap section C′, is independently actuated. The clamp cap C′, is in the form of a cross head, Figs. 15 and 16, and of such weight, as will enable it to properly bear upon a brim, and at each end it is forked, (affording spaces for the pitmen $f^5$,) and provided with stirrups or angular plates $h$, $h$, to which, links $h'$, $h'$, are coupled, for suspending the clamp cap from an arm $h^2$, and a lever $h^3$, on a rock shaft $h^4$, having bearings on the frame of the machine. To the opposite end of the lever $h^3$, a pendent link $h^5$, is coupled, which in turn at its lower end, is hinged to a lever $h^6$, composed of two parallel arms, loosely mounted upon a fulcrum shaft $h^7$, upon which is another lever $h^8$, in part underlying the lever $h^6$, so that an adjusting hand screw $h^9$, passing through it, will bear at its end upon a portion of the lower lever $h^8$. The coupling of the lever $h^3$, to the link $h^5$, is, by means of a movable bearing, adjustable by means of a screw $h^{10}$, at the top of the link, and operating as an abutment for the bearing, which being in a long slot $h^{11}$, provides not only for holding, lowering, and lifting the cap section C', but it also permits a free upward movement of the cap section, when it is lifted otherwise than by way of said link. The screw $h^{10}$, enables a variation in the capacity of the link to lift and to lower the clamp cap section, whenever such changes are desired, as for varying the point at which said section will co-operate with the clamp base section for clamping the brim of a hat. The two levers $h^6$, and $h^8$, although separately fulcrumed on the shaft $h^7$, always operate as one lever, during the actual working of the machine, but in matters of adjustment, the lower lever $h^8$, can be depressed, or permitted to rise, by the rotation of the hand screw $h^9$. A counter balance lever and weight $h^{12}$, projects rearwardly from said levers, and it is directly coupled with the lever $h^8$, which therefore bears upwardly against the hand screw $h^9$, in the lever $h^6$. The lever $h^8$, has a rigid pendent arm carrying a roller $h^{13}$, which is engaged by a cam G, on a cam shaft G', and as said roller can be vertically adjusted by the hand screw $h^9$, said lever may be raised by the cam, either to its fullest lifting capacity, or to any desired lesser portion thereof. The adjustment by way of the hand screw $h^9$, has no special significance in connection with the movement of the clamp cap section C', by way of the link $h^5$, said adjustment being provided for, with special reference to the movement of the clamp base section C, as will be hereinafter more fully indicated. The cam shaft G', is geared for slow speed to a counter shaft H, also geared for slow speed to an overlying clutch shaft I, which is driven by belting from the rapidly driven main shaft F, on which are fast and loose pulleys at $i$, a balance wheel $i'$, and cone pulleys at $i^2$, from which a belt leads to similar pulleys $i^3$, on the clutch shaft I. With the main shaft driven at say five hundred revolutions per minute, and the clutch shaft belted for its fastest speed, the cam shaft G', will be rotated once in thirty seconds, this being the usually desired time for the machine to make a full round of operation.

The cam G, may be properly termed a clamp cam, in that its duty is mainly in connection with the brim clamp.

Figures 11, 12, 13:
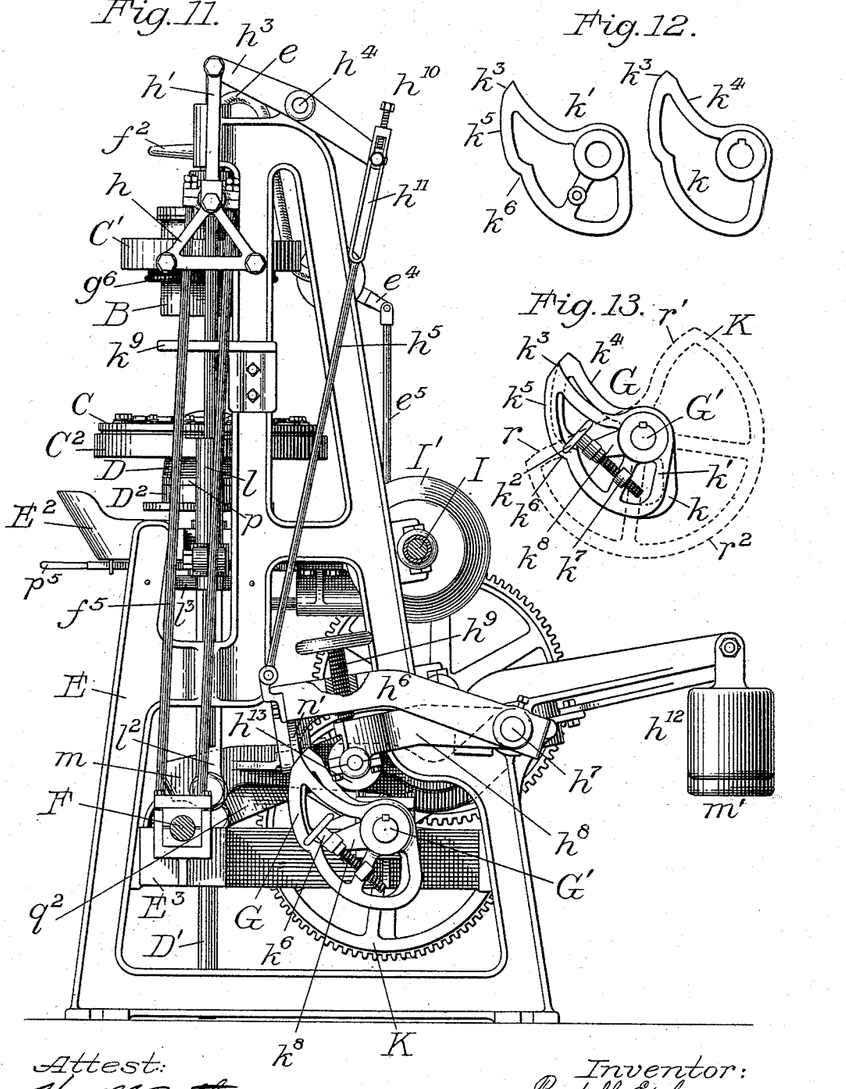
Fig. 11 illustrates my new machine in side elevation with the working parts at rest, but ready for operation.
Fig. 12 illustrates in separate parts an adjustable double cam, which may be termed the brim-clamp-operating cam.
Fig. 13 illustrates the double cam united, and in dotted lines shows the cam which operates the hat-block spindle, and also at times controls the brim-clamp.

The cam G, not only lifts and at times lowers the cap sections C', as indicated, but it also performs lifting duty in connection with the base section C, as will be hereinafter described, and therefore said cam is not only double as to function, but for purposes of adjustment, it is also double in construction, as clearly indicated in Figs. 11, 12, and 13. Said cam is composed of two counter part sections $k$, and $k'$, side by side. The section $k$, is keyed to the cam shaft G', and the section $k'$, is loose thereon. These sections $k$, and $k'$, are adjustably coupled by means of a hand screw $k^2$, so arranged that by turning said screw, the loose section may be so moved that a resting face at $k^3$, may be extended, to say twice the length or extent afforded when the sections register with each other, for reasons which will be hereinafter described in connection with the clamp base C. However these cam sections may be adjusted, the initial lifting face at $k^4$, will always be the same, because the keyed section $k$, performs the sole lifting duty. The cam face $k^5$, serves as a carrier, and it also performs slight lowering duty, said face terminating at $k^6$, the concentric portion of the cam having no active function, except that said portion of the movable section $k'$, has thereon a laterally projecting stud, carrying a swivel nut $k^7$, for engagement by the screw $k^2$, which latter at its shank, is mounted in a swiveled sleeve on an arm $k^8$ which is keyed to the cam shaft, and is parallel with the side of the cam. Having raised the levers $h^6$, and $h^8$, the cam G, although performing a slight lever lowering duty on the cam face $k^5$, is wholly relieved from the duty of finally lowering the clamp cap, as will be hereinafter fully indicated. It should here be observed, that the lifting of said levers, can never initially lower the clamp cap C', below the laterally projecting bars $k^9$, on the side frame plates of the machine. Shown in Figs. 11 and 16.

In the machines disclosed in my before mentioned Letters Patent, Nos. 53,661 and 72,726, the clamp cap section is incapable of any movement, except such as is imparted thereto, or permitted by the base section, and hence the cap section stands obstructively to the convenient and proper mounting of a hat body on the base section, when at rest.

The base section C, of the clamp, is mounted upon a cross head $C^2$, having at each end, pendent sleeves $l$, $l$, which are loosely occupied by the slidable rods $f^4$, $f^4$, before described, these serving as guides for said cross head, as well as for the banding shell cross head. To each sleeve, a wrist pin is properly secured as at $l'$, and $l'$, said pins being connected by links or pitmen $l^2$, $l^2$, with the outer sides and near the free end, of a bow or loop shaped lever m, counter-weighted at the rear, as at $m'$, and fulcrumed upon the shaft or rod $h^7$. As the lever m, affords the proper time and range of movement, it is relied upon for automatically operating the steam valve $e^2$. The steam valve link $e^5$, is shown in Figs. 11 and 16, and connected with said lever m, in Fig. 18. When the clamp base cross head $C^2$, is at its lowest position, and at rest, it is supported upon two ledges afforded by bars $l^3$, $l^3$ on the side plates of the frame, as shown in Figs. 14, 16, and 26, and therefore the lever m, instead of then supporting the cross head, is itself supported at its free end, by way of the cross head ledges, and the pitmen $l^2$, $l^2$. Motion is imparted to said lever, cross head, and clamp base, by the cam G, acting through the lever $h^6$, which is operatively (but not positively)

coupled with the loop shaped lever, as follows: Near said lever $h^6$, the lever $m$, is provided at one side with a laterally projecting lug $n$, affording a face at its under side, for engagement in lifting contact by the top of a bent arm $n'$, secured to the free end of said lever $h^6$, and projecting downwardly and laterally therefrom, as clearly indicated in Figs. 11 and 18. It will now be seen, that the cam G, will lift the base section C, of the clamp, and also that the adjusting screw $h^9$, on the lever $h^6$, will enable the cam to vary in the extent of its brim clamp lifting action; and that the cam adjusting screw $k^2$, enables a variation in the time, during which the clamp is to be maintained in its extreme elevated position, by said cam; and determines the time and point at which the brim clamp is taken under control by the block carrying mechanism, as will be hereinafter explained. Although the two sections of the clamp, are at times wholly under the control of the mechanism by which the hat block D, is raised and lowered, as hereinbefore indicated, I will now explain the control of both of the brim clamp sections, by the cam G. With said sections at rest as shown in Figs. 11, 14, and 16, the base section C, is at its lowest position, and the cap section is held wholly out of the way of the operator, and at its highest position, as also fairly indicated in Fig. 5. The rotation of the cam G, raises the base section C, and lowers the cap section C' so as to clamp the brim of a hat body already placed upon the base section, the clamping action occurring at say the dotted line X, Fig. 16. Then said cam continuing its movement, lifts both sections until they pass the position indicated in Fig. 6, and reach the extreme elevation, indicated in Fig. 8, and then they are slightly lowered to the position indicated in Fig. 9, at which time the cam G', ceases to act, and surrenders the brim clamp as a whole, to the control of the block carrying mechanism. It should be observed, that the slotted link connection at the cross head lever of the cap section C', offers no obstruction to the independent upward movement of said cap section.

Figure 18:
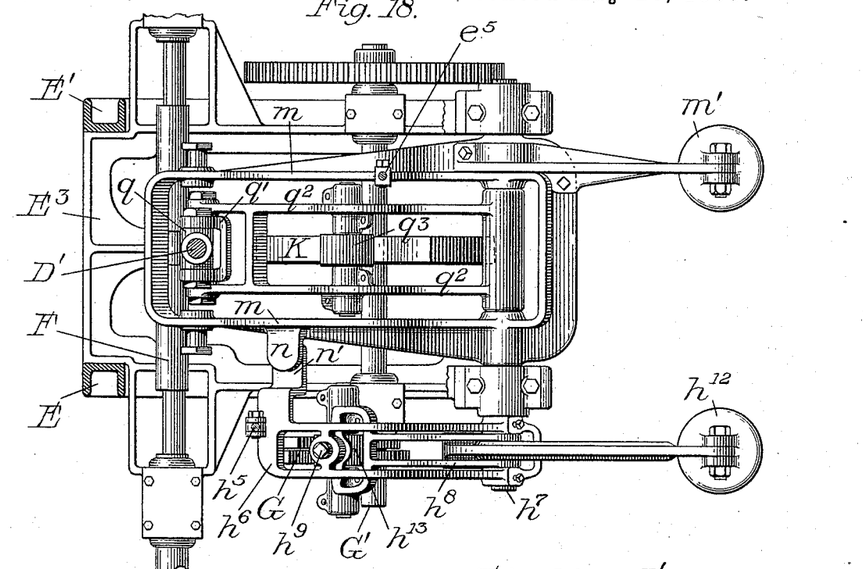
Fig. 18 is a horizontal section of the machine near its base, showing the main operating mechanism in top view.
Figure 19:
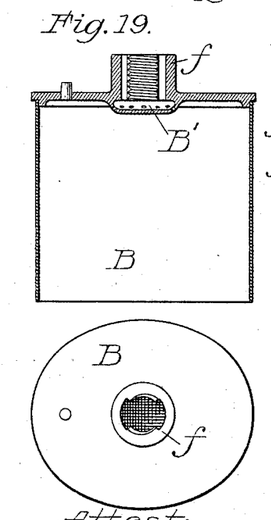
Fig. 19 illustrates the banding-shell detached in two views, lateral section and top.
Figure 20:
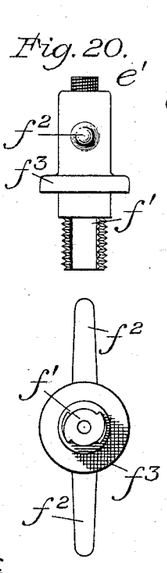
Fig. 20 in side and bottom views illustrates the stem by which the banding-shell is mounted for service.
Figure 21:
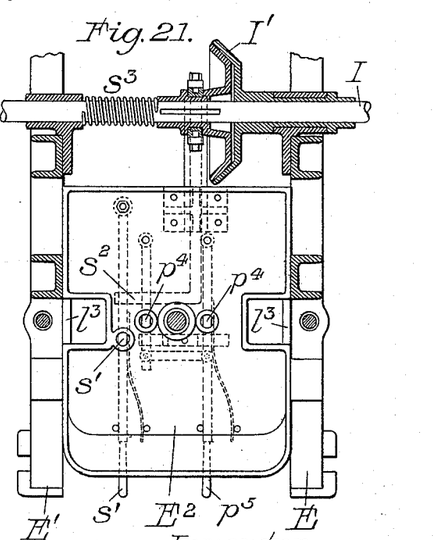
Fig. 21 is a partial horizontal section of the machine for illustrating the starting and stopping mechanism and the means for holding and releasing an auxiliary block-carrier.
Figure 22:
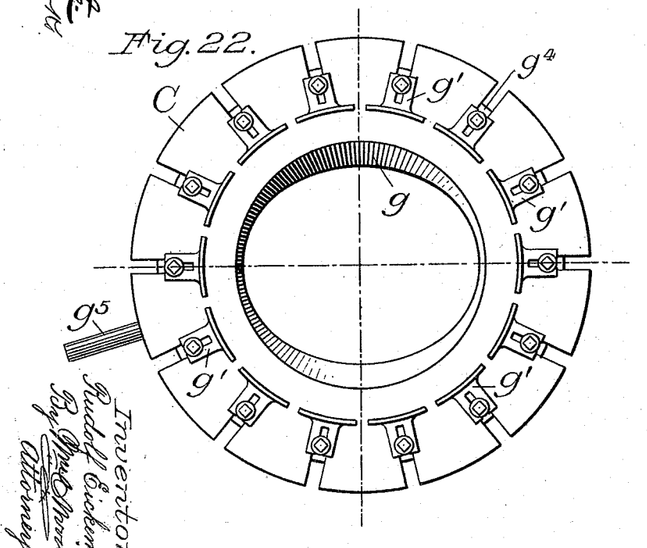
Figs. 22 and 23 are respectively top and bottom views of an adjustable brim-gage and clamp-base.
Figures 23, 25:
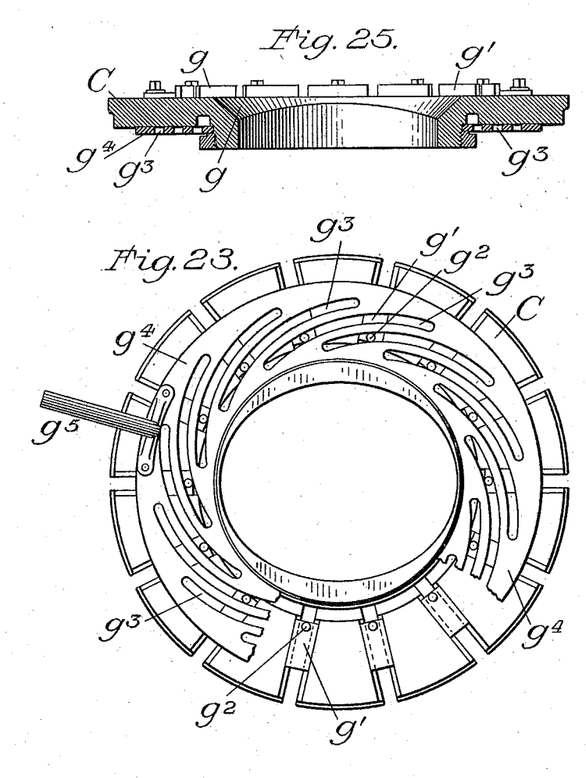
Figs. 24 and 25 illustrate the same in section on different diametric lines.
Figure 24:
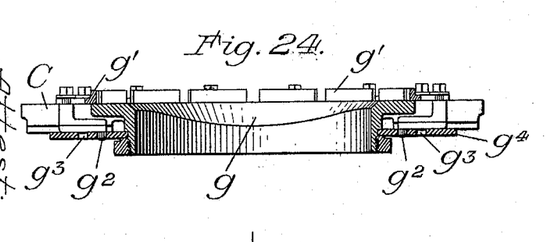

Now referring to the hat block D, it is to be understood that it is mounted in a novel manner upon its spindle D', by means of a main carrier $D^2$, and an auxiliary carrier, consisting in part of a disk $p$, provided with holes for the reception of dowel pins $p'$, $p'$, which at times project through said holes, and occupy registering holes in the block. Said disk $p$, is provided with two pendent rods $p^2$, $p^2$, which at times, support said disk and the block, said rods occupying vertical tubular guide bearings $p^3$, $p^3$, in the main block carrier $D^2$, and being at times free to slide through appropriate holes in the frame plate $E^2$, as indicated in Fig. 16, wherein the block with a banded hat thereon, is shown to be still maintained upon the auxiliary carrier, and on a level with the base section of the clamp which is in its lowest position, while the main carrier $D^2$, has been fully lowered. The block with its auxiliary carrier, is thus supported by its rods, resting endwise, upon two pivoted horizontal bars, $p^4$, $p^4$, which are parallel, and coupled together, and provided with a spring which normally causes both bars to underlie the paths of the rods $p^2$, $p^2$, and one of the bars, extends beyond the front of the machine and serves as a handle $p^5$, as indicated in Fig. 21. Upon moving these bars laterally, the auxiliary carrier will drop to the main carrier, this being done; after the block with a banded hat has been removed, the carrier as a whole, then being ready to receive another block. Banding machines as heretofore organized, have had no auxiliary carrier, and hence while the block with its hat is descending, the operator must be at hand, and skillfully seize the block, and keep it from being dropped through and below the brim clamp, with more or less attendant derangement and injury to the hat. With my auxiliary carrier, the bars, $p^4$, $p^4$, spring into their supporting positions, as soon as the rods leave their holes in the frame plate, during the upward movement, and therefore when the main carrier descends, the auxiliary carrier remains in the desired elevated position, so that the operator being free to remove the hat at will, can attend two or more blocking machines, or one blocking machine, and also appropriate adjacent stretching machines. The block spindle D', has guide bearings in the lateral frame plates $E^2$, and $E^3$, and it is provided with a cross head $q$, above its lower guide bearing as shown in Figs. 14, 18 and 26. This cross head has two lateral wrist pins, with which a short bow shaped pitman $q'$, is connected, said pitman being also provided with two lateral wrist pins, by which the pitman is connected with the free end of a lever $q^2$, which is fulcrumed upon the shaft or rod $h^7$, before described. The lever $q^2$, has two parallel arms, connected by a sleeved hub at the fulcrum shaft, and by a lateral brace near the free end, as shown in Fig. 18. The lever $q^2$, is also provided with a lateral shaft, carrying a roller $q^3$, centrally located, and overlying the face of a large cam K, on the cam shaft G'. This cam K, has a lifting face $r$, a lowering face $r'$, and a concentric resting or carrying face $r^2$, this latter operating for nearly two thirds of the revolution of the cam, as clearly shown in Fig. 13, in dotted lines, in connection with the cam G. It will now be understood, that during the final lifting action by the face $r$, of this cam K, the latter wholly relieves the cam G, from duty, and that during the movement of the resting or carrying face $r^2$, of the cam K, the latter carries the weight of the block and spindle, and both clamp sections, and that the lowering face $r'$, of said cam lowers the clamp base to its position of rest, leaves the block at the same level, lowers the main block carrier to its resting position, and elevates the clamp cap section to its highest position.

The main shaft F, is continuously operated, except when the driving belt is thrown from the fast to the loose pulley. The clutch shaft I, is also continuously driven, the cam shaft G, being only operated when the spring actuated clutch I', has been set for service.

The starting, and the automatic stopping mechanism, is as heretofore in prior hatting machines devised by me, and is illustrated in Fig. 21.

When the machine is at rest, a stop pin $s$ on the block carrier $D^2$ depresses the hand lever $s'$, which in turn, so holds a rock shaft or shipper lever $s^2$, as to maintain the clutch faces in a separated condition. When said hand lever has been moved laterally from beneath the stop pin, said lever is free to rise, and so frees the rock shaft, as to permit the clutch spring $s^3$, to act in closing the clutch and starting the cam shaft. The hand lever being actuated by a spring, resumes its normal position, so that when the block carrier next descends, the stop pin depresses the hand lever, and opens the clutch, thus restricting each movement of the cam shaft, to one rotation.

Having indicated separately, the movements of the several parts of the machine, it will be readily understood, that each round of operation will be as follows: With the machine at rest, as indicated in Figs. 11, 14 and 16, a hot wet hat body $A^2$, is placed upright and accurately adjusted upon the base of the brim clamp, and the clutch lever then shifted. The clamp base carrying the hat then rises, until it is met by the descending cap section of the clamp, which rests upon the base, and clamps the brim adjacent to the band portion only. The two clamp sections continue rising together, and insert the crown of the hat into the reciprocating banding shell. Steam is then admitted to the shell, and as the hat body is lifted, it is inverted by the steam until fully distended, inside out, the brim clamp then being considerably above the edge of the shell. The hat block in the meantime rises, and by engaging with the hat body at the tip, commences to turn the hat body right side out, within the shell, the pressure of the steam compacting and laying the tip and side crown smoothly upon the block, the brim clamp in the meantime moving downwardly, as rapidly as the block moves upwardly, and keeping the felt free from straining over the edge of the shell. The clamp then meets and rests upon the flange of the block carrier, which in its terminal upward movement, carries the brim clamp with it. The banding shell operating with jiggering movement, and the hat body being permeated with steam, and with the very hot water of condensation, contracts the band portion of the hat body by felting action, which is concluded, with the brim clamp substantially in line with the edge or bottom of the shell, and without straining the felt, which at all times has been left free to respond to the contractions and changes of form, secured by the felting action. This is usually accomplished in say twenty seconds, whereupon the block descends, steam is cut off, the clamp cap section moves downwardly with the block a short distance, is then left behind, and then rises to its full height, the clamp base section is left at its lowest position, the hat and block, are left on a level with the clamp base, by the auxiliary block carrier, and the main carrier descends to its lowest position, and rests. The operator then removes the block and hat, and preparatory to another operation, he permits the auxiliary carrier to drop, and places another block thereon.

It will be observed, notwithstanding the many niceties involved in the co-operative action of the brim clamp sections with each other, and with the banding shell, and with the hat block carrier, that the mechanism is exceedingly simple and effective, and it will be obvious, that variations therein, in the direction of complexity, should involve no departure from the mechanical features of my invention.

As to the method, which constitutes the main feature of my invention, it will be obvious, that no departure therefrom will be involved in variations in mechanical organizations, which have for their sole object, the performance of the several steps of my novel method, in a safe, rapid, economical, and commercially valuable manner.

Having thus described the several features of my invention, I claim as new and desire to secure by Letters Patent—

1. The method of blocking and banding felt hats, substantially as hereinbefore described, the same consisting in distending the inverted crown of a previously stretched hat body, by steam pressure, and permeating it with hot water, incident to condensation of the steam in direct contact with the felt; then while so distended and permeated, turning the crown of the hat body right side out, and permitting the steam under suitable pressure, to compactly and smoothly lay the felt upon the top and sides of a suitable support; and then, while the hat is on said support and properly clamped at its brim, and still permeated by hot water and steam, gradually felting the normally large and flaring band portion of the hat body, and by said felting action, diametrically contracting said band portion into form, and to dimensions appropriate to the side crown, and in substantial conformity with the band surface of the support or block.

2. In a hat blocking or banding machine, the combination substantially as hereinbefore described, of a rapidly reciprocated or jiggering banding shell, provided with means for intermittingly supplying steam to its interior; a brim clamp, composed of a base, and a cap section, both of which are independently moved toward and from each other, and which are also moved together while doing clamping duty, and clamp operating mechanism for imparting said movements; a vertically reciprocated hat block carrier, which when adjacent to the banding shell, supports the brim clamp, and during its downward movements, carries at first both sections of said brim clamp, then leaves the cap section to the custody of its own operating mechanism, and then leaves the base section of the clamp at its position of rest.

3. In a hat blocking or banding machine, a brim clamp, composed of a base section, and a normally suspended cap section, in combination with coupled levers, coupled respectively by separate links to appropriate clamp sections, and a cam which lifts said levers, and thereby simultaneously lifts the base section and lowers the cap section.

4. In a hat blocking or banding machine, the combination of a brim clamp, composed of a base section, and a normally suspended cap section; a clamp cam, operating through coupled levers, coupled respectively to appropriate clamp sections, for lifting the base, lowering the cap, and placing them in clamping relations; a hat block carrier below said base section, and mounted on a vertical spindle; a lever coupled to said spindle, and a cam which engages with said spindle lever, lifts said block carrier, and enables it to lift and to carry both sections of the brim clamp, independently of the clamp cam.

5. In a hat blocking or banding machine, the combination of a brim clamp consisting of a base section, and a cap section; a double cam composed of parts adjustable with reference to each other, and intermediate mechanism, by which said cam is enabled to impart separate movements to both of said clamp sections, to move both together when doing clamping duty, and to vary the time at which the clamp as a whole, is maintained at its highest position, substantially as described.

6. In a hat blocking or banding machine, a brim clamp, having a base section, and a cap section which is suspended from a lever, in combination with a cam, a lever lifted by said cam, and a link, which is hinged to said cam actuated lever, and is coupled to said suspending lever by a slotted connection, substantially as described, whereby said cap section is normally held in its highest position, for affording free access to the base section, and when lowered, is free to be lifted independently of the action of said cam and link.

7. In a hat blocking or banding machine, a cap section of its brim clamp suspended from levers, a longitudinally slotted link coupled to one of said levers, by a sliding joint; an adjusting screw which overlies said joint, and practically lessens the length of said slot, in combination with cam actuated mechanism for reciprocating said link, substantially as described, whereby the control of the clamp cap by said link may be varied.

8. In a hat blocking or banding machine, the combination with a reciprocating banding shell and a brim clamp base section, of a cap section provided with a pendent flange affording a narrow annular biting face, which restricts the clamping action upon a hat body, to that portion of the brim which is remote from the edge and is adjacent to the flaring or band portion, substantially as described.

9. In a hat blocking or banding machine, the combination with an annular banding device, of a brim clamp composed of a cap section, and a base section which has a brim supporting surface, and is provided on its face with a series of radially movable brim edge gaging contact blocks, and a rotative cam plate for simultaneously adjusting said blocks, and enabling them, by contact with the edges of the brims of hat bodies of various sizes, to properly gage each hat body, for entering its crown within the banding device.

10. In a hat blocking or banding machine, a brim clamp base, having the usual opening for the reception of a hat block, inwardly and downwardly beveled at its edge, in combination with a clamp cap section having a pendent clamping face which bears upon the face of the base section, outside of said beveled edges, substantially as described, whereby the band portion of a hat body and the adjacent portion of the brim, are left free to assume various positions, incident to the banding operation.

11. In a hat blocking or banding machine, the combination with a cross head, of a banding shell provided with a neck having a longitudinally slotted screw thread, and a stem provided with a correspondingly threaded and slotted neck adapted to couple with the neck of the shell, substantially as described, whereby the banding shell may be promptly applied to, and removed from said stem, and cross head.

12. In a hat blocking or banding machine, the combination substantially as hereinbefore described, of a banding shell, a cross head carrying said shell, mechanism for rapidly reciprocating said cross head and shell, and a suitable steam pipe, communicating with the interior of the shell for supplying steam thereto while being reciprocated.

13. The combination with a hat banding shell, of an interior steam chamber, laterally perforated, substantially as described, for securing a favorable distribution of the water incident to condensation upon the particular portions of a hat body to be operated upon by the banding shell.

14. In a hat blocking or banding machine, the combination substantially as hereinbefore described, of a brim clamp provided with supports on which its base rests when not in service; a main hat block carrier independent of the brim clamp mounted on a vertically slidable spindle, and an auxiliary block carrier, carried upon the main carrier but vertically movable independently thereof, and means for temporarily supporting said auxiliary carrier, independently of the main carrier, whereby when the main, and the auxiliary carrier descend with a block having a banded hat thereon, the main carriers will descend to their lowest positions, and leave the auxiliary carrier on a level with the brim clamp, with the block and hat convenient for removal.

15. The combination with a hat block carrier and its reciprocating supporting spindle, of an auxiliary block carrier, carried by the main carrier, but vertically separable therefrom, and provided with pendent rods; and spring actuated bars which normally underlie said rods, for supporting the auxiliary carrier independently of the main carrier when the latter is fully depressed, and which by being moved aside, permit the auxiliary carrier to drop to the main carrier, substantially as described.

RUDOLF EICKEMEYER.

Witnesses:
CARL EICKEMEYER,
RUDOLF EICKEMEYER, Jr.